(12) United States Patent
Mosek

(10) Patent No.: US 7,882,249 B2
(45) Date of Patent: Feb. 1, 2011

(54) METHODS AND SYSTEMS FOR COMMUNICATING WITH STORAGE SYSTEMS USING SLIM IP STACKS

(75) Inventor: Amir Mosek, Tel Aviv (IL)

(73) Assignee: SanDisk IL Ltd., Kfar Saba (IL)

( * ) Notice: Subject to any disclaimer, the term of this patent is extended or adjusted under 35 U.S.C. 154(b) by 150 days.

(21) Appl. No.: 11/969,929

(22) Filed: Jan. 7, 2008

(65) Prior Publication Data

US 2009/0177781 A1    Jul. 9, 2009

(51) Int. Cl.
   *G06F 15/16*    (2006.01)
(52) U.S. Cl. ...................................... 709/228; 709/227
(58) Field of Classification Search ................. 709/224, 709/227, 228, 229, 230
   See application file for complete search history.

(56) References Cited

U.S. PATENT DOCUMENTS

| | | | | |
|---|---|---|---|---|
| 5,732,213 | A * | 3/1998 | Gessel et al. | ................. 709/224 |
| 7,328,144 | B1 * | 2/2008 | Grier et al. | ..................... 703/22 |
| 2004/0215688 | A1 | 10/2004 | Frank et al. | |
| 2004/0221050 | A1 | 11/2004 | Smith | |
| 2005/0165885 | A1 * | 7/2005 | Wong | ......................... 709/201 |
| 2005/0204071 | A1 | 9/2005 | Vance | |
| 2006/0026257 | A1 | 2/2006 | Frank et al. | |
| 2006/0187925 | A1 | 8/2006 | Brune et al. | |
| 2007/0239857 | A1 | 10/2007 | Mahalal et al. | |
| 2007/0255783 | A1 | 11/2007 | Kamvysselis | |
| 2008/0126653 | A1 * | 5/2008 | King et al. | .................. 710/300 |

* cited by examiner

*Primary Examiner*—Ramy M Osman
*Assistant Examiner*—Marshall McLeod
(74) *Attorney, Agent, or Firm*—Martine Penilla & Gencarella, LLP

(57) ABSTRACT

Methods, and associated devices, media, and systems, for establishing a communication link between a host system and a storage device are provided. Such a method includes the steps of: providing a communication stack having only an application layer and a physical layer; and establishing a communication channel between a host system and the storage device using the communication stack. The step of establishing may be performed via a TCP/IP emulator in a host-system side and a storage-command interpreter in a storage-device side. The method may further include: establishing a communication channel between the host system and a device having a static-IP address; and establishing a communication channel between the host system and a device having a storage identifier that is embedded into one of command parameters sent by the application layer or the physical layer to the TCP/IP emulator.

13 Claims, 4 Drawing Sheets

METHODS AND SYSTEMS FOR COMMUNICATING WITH STORAGE SYSTEMS USING SLIM IP STACKS

FIELD AND BACKGROUND OF THE INVENTION

Example embodiments described herein relate to methods and systems for communicating with storage devices using slim IP stacks.

Communication protocols (e.g. Transmission Control Protocol/Internet Protocol (TCP/IP) and protocols based on the Open Systems Interconnection basic reference model (OSI model)) are configured specifically for networking applications including the Internet. Such protocols are often developed with a single purpose in mind, specifically network communication. Applications may communicate over a network using different communication protocols. Besides there being a wide array of applications and protocols, the network hardware (e.g. receivers, transmitters, and cables) can differ from device to device. The OSI model utilizes a multi-level scheme to provide a flexible solution that accommodates all such variation with a standard interface.

Because each protocol module usually communicates with two other modules, the modules are commonly referred to as "layers" in a stack of protocols. In the OSI model, there are seven layers. The layers are: application, presentation, session, transport, network, data link, and physical. A layer is a collection of related functions that provides services to the layer above it and receives service from the layer below it. The lowest layer (known as the physical layer) always deals with low-level, physical interaction of the hardware. Every higher layer adds more features. User applications usually deal only with the top-most layers (known as the application and presentation layers in OSI).

The TCP/IP reference model consists of four layers (application, transport, internet, network access). The network access layer may be thought of as a "bundling," of the network, data link, and physical layers in the OSI model, and the application layer may be thought of as a "bundling" of the application and presentation layers in OSI. An example of the layers in a TCP/IP implementation for accessing the Internet, in top-down hierarchy, is as follows:

(1) ethernet and R45/CAT5 (network-access layer):
(2) IP commands (internet layer);
(3) TCP commands (transport layer); and
(4) web browser commands such as http (application layer).

TCP/IP enables features that currently are not supported by logical block addressing (LBA) architecture typically used to access storage devices. However, TCP/IP (and communication protocols based on OSI) is mostly suited to communication between applications executed from different systems (e.g. different operating system and hardware) to communicate with each other in a standard way. Furthermore, extensive modifications to LBA architecture and associated applications are necessary in order to employ LBA as a standard in security and communication applications between client and server applications, for example.

Storage devices that utilize LBA architecture (e.g. file system and block device driver) provide a standard command for retrieving information from the storage device (e.g. vendor ID/name). Such a configuration only partially solves the problem of obtaining the properties (e.g. security and compression properties) of the storage device, since the storage device is limited to export only standard capabilities, not proprietary ones. Implementation of TCP/IP in storage-device architectures has not been utilized in the art for such data-access applications.

Network chip developers have implemented the full TCP/IP stack as hardware components. Furthermore, simple tasks that do not require the full TCP/IP stack have been handled by reduced stacks in which the upper layers are not implemented. Examples of tasks using such implementations include the "ping" operation in which only the network-access layer is needed, and the User Datagram Protocol (UDP), a broadcast protocol that uses only the three lower layers of a standard TCP/IP stack (i.e. network-access, internet, and transport layers). Such approaches are not capable of handling applications that require the use of the application layer of the standard TCP/IP stack.

It would be desirable to have methods and systems for communicating with storage devices using slim IP stacks.

SUMMARY OF THE INVENTION

The example embodiments described herein provide methods and systems for communicating with storage devices using slim IP stacks.

Example embodiments described herein teach storage-device drivers that emulate a full TCP/IP stack without implementing the standard TCP/IP stack, for allowing communication between the storage device and a host system. The driver executed on the host-system side exports the same application programming interface (API) to the application layer that is exported by a standard TCP/IP stack, via a TCP/IP emulator. However, the driver executed on the storage-device side does not manipulate data that is sent/received to/from the storage device from/to the host system; the driver only transfers the data (i.e. there is no internal data-formatting performed by the driver).

The need for such internal data-formatting can be eliminated—and the standard TCP/IP stack can be reduced to a slim IP stack (i.e. obviating the need to implement the whole standard TCP/IP stack)—when the storage device has available to it a clear identifier (such as a specific IP address or the storage name www.myStorage.com embedded into the command parameters that the TCP/IP stack receives from the application layer running on the host side). Reasons for this are as follows.

Given that a clear identifier is available to the storage device, data, commands, or other designations (for simplicity, referred to in the discussion immediately hereafter as "designations") can be sent from a host system directly to the storage device without being routed through a network, which is ordinarily used to direct the designations to their correct destinations. Since designations are sent directly from the host system to the storage device, not via a network, there is no need to employ (1) headers (which are used to route the designations to their correct destinations), or (2) footers, which contain a checksum used to correct errors generated by going through the network.

In addition, since the designations are sent directly from the host system to the storage device, not via a network, there is no need to (3) divide the a designation into "chunks" or packets (which is performed in network routing to improve efficiency of transmission), or (4) to manage timeouts, since security and other concerns addressed by a timeout functionality are, at least to a significant extent, rendered moot since designations are transmitted directly from the host system to the storage device without going through a public network.

Since the direct transmission of designations from the host system to the storage device obviates the need for items (1), (2), (3), and (4), there is no need for intermediate layers between the physical layers) and the application layer(s) of a communication stack, because the purpose of such intermediate layers is specifically to handle items (1), (2), (3), and (4), and other issues that arise due to the fact that designations are transmitted from the host system to the storage device indirectly (i.e. via a network).

In this way, then, it is understood that the provision of a clear identifier for a storage device, which enables direct transmission of designations from a host system to the storage device, without going through a network, eliminates the need for the layers intermediate to the application and the physical layers. Such an identification scheme can be a parameter that is embedded into the command parameters (sent by the application layers or the physical layers to the TCP/IP emulator), and that indicates that the storage device is the destination device. Examples of identifiers include (1) the name of the storage device (e.g. "my storage") or (2) static-IP addresses.

Example embodiments described herein can improve the performance and power consumption of a storage device, and in turn reduce the cost, by eliminating the layers of an IP stack that require hardware logic.

Therefore, according to example embodiments described herein, there is provided for the first time a method for establishing a communication link between a host system and a storage device, the method including the steps of: (a) providing a communication stack having only an application layer and a physical layer; and (b) establishing a communication channel between a host system and the storage device using the communication stack.

The step of establishing may be performed via a TCP/IP emulator in a host-system side and a storage-command interpreter in a storage-device side.

The communication stack may reside only in the host-system side, and wherein a storage-command module and a physical layer may reside in the storage-device side.

The method may further include: (c) establishing a communication channel between the host system and a device having a static-IP address; and (d) establishing a communication channel between the host system and a device having a storage identifier that is embedded into one of command parameters sent by the application layer or the physical layer to the TCP/IP emulator.

According to example embodiments described herein, there is provided for the first time a computer-readable storage medium having computer-readable code embodied therein for causing a communication link to be established between a host system and a storage device, the computer-readable code including: (a) stack code for providing a communication stack having only an application layer and a physical layer; and (b) communication code for establishing a communication channel between the host system and the storage device using the communication stack.

The communication channel may be established via a TCP/IP emulator in a host-system side and a storage-command interpreter in a storage-device side.

The communication stack may reside only in the host-system side, and wherein a storage-command module and a physical layer may reside in the storage-device side.

The computer-readable code may further include: (c) communication code for establishing a communication channel between the host system and a device having a static-IP address; and (d) communication code for establishing a communication channel between the host system and a device having a storage identifier that is embedded into one of command parameters sent by the application layer or the physical layer to the TCP/IP emulator.

According to example embodiments described herein, there is provided for the first time a storage device for communicating with a host system, the storage device including: (a) a non-volatile memory for storing data; (b) a memory controller for controlling the non-volatile memory; (c) a processor for executing program code residing in the non-volatile memory, wherein the program code includes: (i) stack code for providing a communication stack having only an application layer and a physical layer; and (ii) communication code for establishing a communication channel between the host system and the storage device using the communication stack.

The communication channel may be established via a TCP/IP emulator in a host-system side and a storage-command interpreter in a storage-device side.

The communication stack may reside only in the host-system side, and wherein a storage-command module and a physical layer may reside in the storage-device side.

The program code may further include: (iii) communication code for establishing a communication channel between the host system and a device having a static-IP address; and (iv) communication code for establishing a communication channel between the host system and a device having a storage identifier that is embedded into one of command parameters sent by the application layer or the physical layer to the TCP/IP emulator.

The device may be configured as one of: a SIM card, a USB flash-memory device, an MMC card, and an SD card.

According to example embodiments described herein, there is provided for the first time a storage device for communicating with a host system, the storage device including: (a) a non-volatile memory for storing data; and (b) a memory controller for controlling the non-volatile memory, the memory controller configured. (i) to provide a communication stack having only an application layer and a physical layer; and (ii) to establish a communication channel between the host system and the storage device using the communication stack.

The memory controller may be further configured to establish the communication channel via a TCP/IP emulator in a host-system side and a storage-command interpreter in a storage-device side.

The communication stack may reside only in the host-system side, and wherein a storage-command module and a physical layer may reside in the storage-device side.

The memory controller may be further configured: (iii) to establish a communication channel between the host system and a device having a static-IP address; and (iv) to establish a communication channel between the host system and a device having a storage identifier that is embedded into one of command parameters sent by the application layer or the physical layer to the TCP/IP emulator.

The device may be configured as one of: a SIM card, a USB flash-memory device, an MMC card, and an SD card.

According to example embodiments described herein, there is provided for the first time a storage system including: (a) the storage device described above; and (b) a host system for exchanging data with the storage device using the communication channel.

The communication channel may be established via a TCP/IP emulator in a host-system side and a storage-command interpreter in a storage-device side.

The communication stack may reside only in the host-system side, and wherein a storage-command module and a physical layer may reside in the storage-device side.

The memory controller may be further configured: (iii) to establish a communication channel between the host system and a device having a static-IP address; and (iv) to establish a communication channel between the host system and a device having a storage identifier that is embedded into one of command parameters sent by the application layer or the physical layer to the TCP/IP emulator.

The storage device may be configured as one of: a SIM card, a USB flash-memory device, an MMC card, and an SD card.

The host system may be configured as one of: a cellular phone, a PDA, a laptop computer, and a desktop computer.

These and further embodiments will be apparent from the detailed description and examples that follow.

BRIEF DESCRIPTION OF THE DRAWINGS

Example embodiments are herein described, with reference to the accompanying drawings, wherein.

DESCRIPTION OF THE PREFERRED EMBODIMENTS

Example embodiments described herein relate to methods and systems for communicating with storage devices using slim IP stacks. The principles and operation for communicating with storage devices using slim IP stacks, according to example embodiments described herein, may be better understood with reference to the accompanying description and the drawings.

Figure 1:
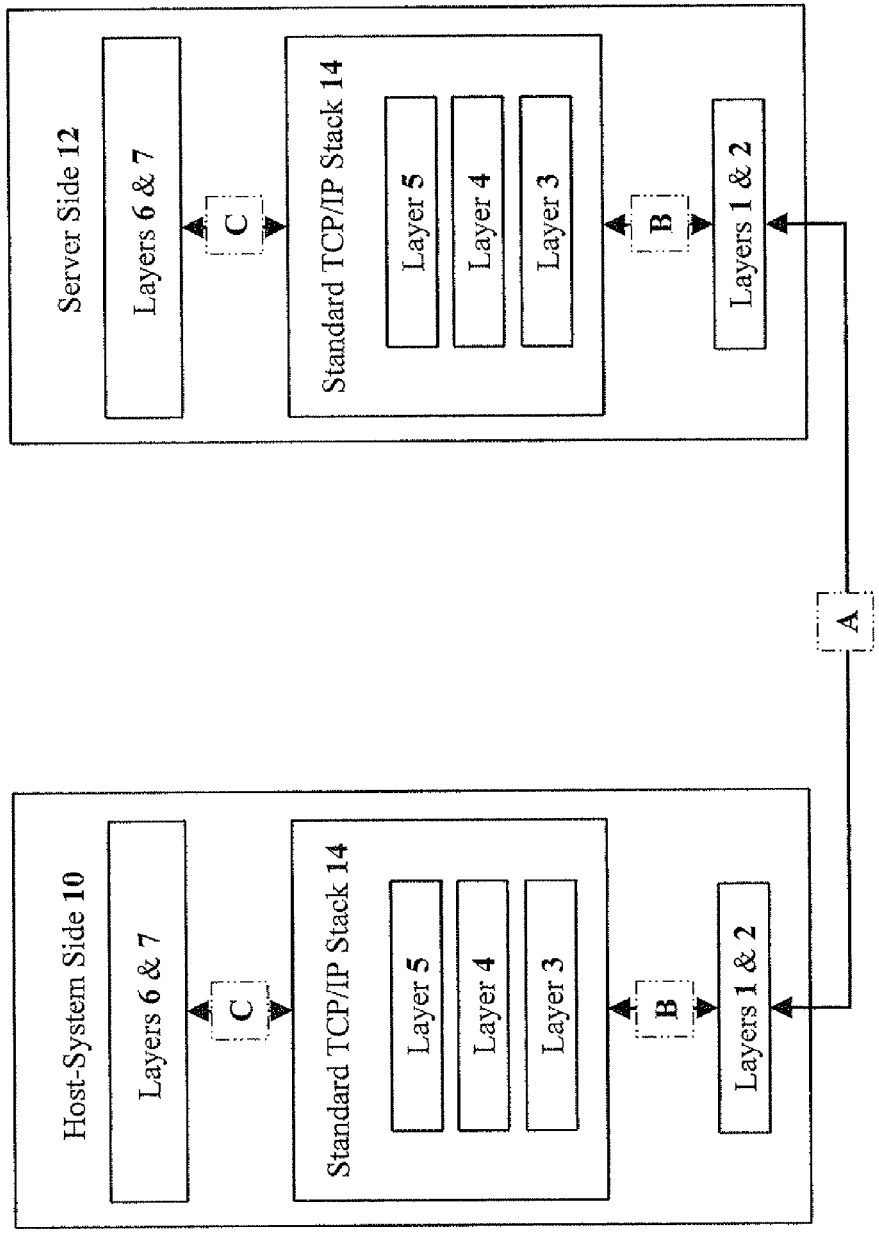
FIG. 1 is a simplified schematic block diagram of an implementation of a communication architecture using a standard TCP/IP stack, according to the prior art.

Referring now to the drawings, FIG. 1 is a simplified schematic block diagram of an implementation of a communication architecture using a standard TCP/IP stack, according to the prior art. For clearer understanding, the seven layers of the OSI model are used in FIG. 1. In a host-system side 10 (e.g. of a web browser) and a server side 12 (e.g., of an http or file server), a standard TCP/IP stack 14 is shown having layers 3, 4, and 5. Layer 3 corresponds to IP-address manipulation, Layer 4 corresponds to checksum operations and data segmentation, and Layer 5 corresponds to open/close socket and send/receive operations.

The above mentioned OSI layers may be implemented in TCP/IP systems in the following software or hardware module configurations: Layers 1 & 2 (as well as layers 6 & 7) are shown outside standard TCP/IP stack 14 as separated software or hardware modules because these layers are retained in example embodiments described herein. Layer 1 corresponds to the physical interface bus, and Layer 2 corresponds to the interface driver. Layers 6 & 7 correspond to application commands (e.g. http and API commands). Communication between host-system side 10 and server side 12 is enabled by a data-transport interface A via their respective pairs of layers 1 & 2. Data is exchanged with respective TCP/IP stacks 14 via respective data-link interfaces B. Data is exchanged with applications via respective TCP/IP stack interfaces C.

Figure 2:
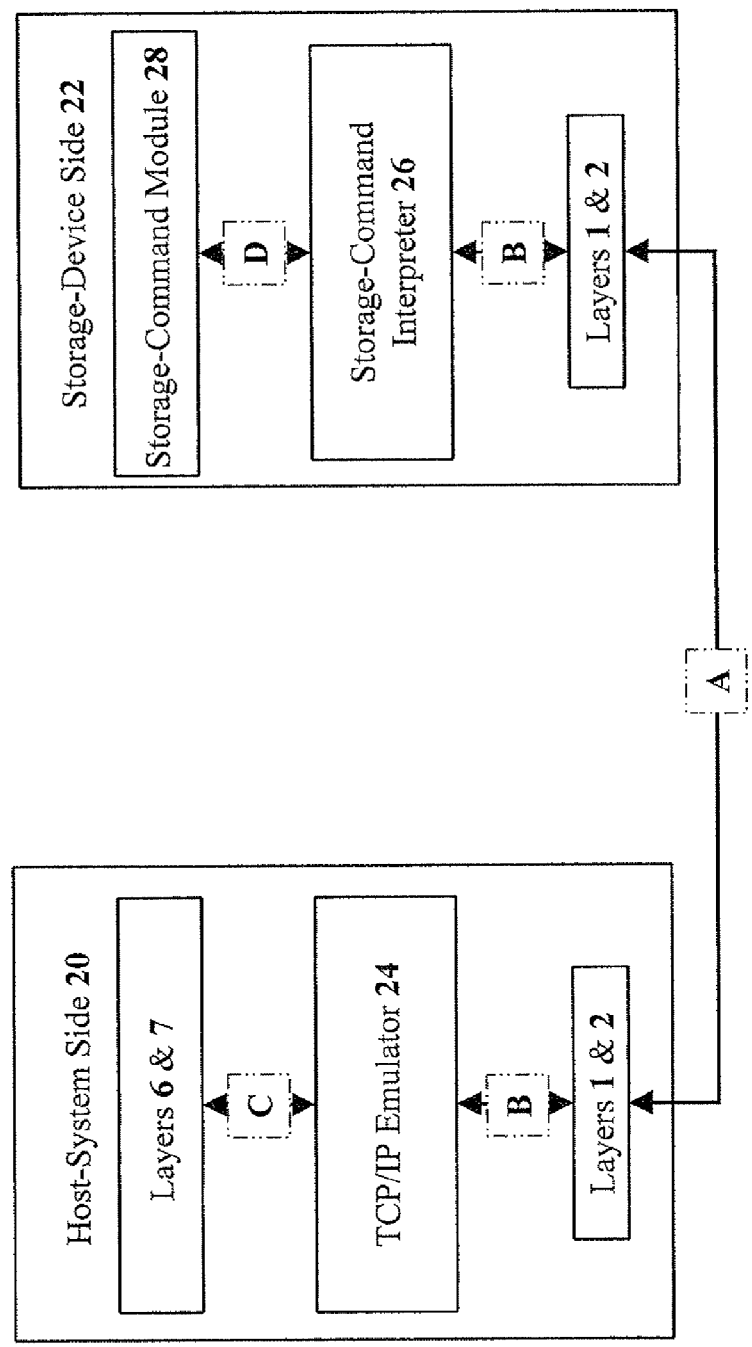
FIG. 2 is a simplified schematic block diagram of an implementation of a communication architecture using a slim TCP/IP stack, according to example embodiments described herein.

FIG. 2 is a simplified schematic block diagram of an implementation of a communication architecture using a slim TCP/IP stack, according to example embodiments described herein. A host-system side 20 and a storage-device side 22 are shown in FIG. 2, each having layers 1 & 2 as in FIG. 1. Communication is enabled by data-transport interface A. In host-system side 20, data is exchanged to/from layers 1 & 2 from/to a TCP/IP emulator 24 via data-link interface B. Data is exchanged to/from TCP/IP emulator 24 from/to layers 6 & 7 via TCP/IP stack interface C. TCP/IP emulator 24 provides the requisite data handling for applications to properly recognize and execute data operations and application commands.

More specifically, TCP/IP emulator 24 converts the TCP/IP commands from TCP/IP interface C commands into physical port-driver commands sent via interface B. This is mainly done by encapsulating (i.e. wrapping the TCP/IP commands with header and footers of the commands used by the physical port-driver interface) the TCP/IP commands received via interface C into physical port driver commands that are sent via interface B.

Layers 1 & 2 and layers 6 & 7 have been used to show relation to the TCP/IP scheme and the OSI model. However, layers 1 & 2 and layers 6 & 7 are considered "bundled" layers. That is, layers 1 & 2 are considered a "bundled" physical layer, and layers 6 & 7 are considered a "bundled" application layer.

Thus, the slim TCP/IP stack of FIG. 2 implements the seven OSI layers into three modules (an application-layer module, a physical-layer module, and a TCP/IP-emulator module). TCP/IP emulator 24 effectively replaces (though it does not perform identical functions as) OSI layers 3, 4, and 5.

In storage-device side 22, data is exchanged to/from layers 1 & 2 from/to a storage-command interpreter 26 via data-link interface B. Storage-command interpreter 26 converts the TCP/IP commands to storage commands. Storage-command interpreter 26 then sends the storage commands to storage-command module 28 via a storage-command interface D. Storage-command module 28 is a repository of storage commands (e.g. store, load, encrypt, compress) that can be selected for execution by storage-command interpreter 26. In such an implementation, layers 1 & 2 are standard storage-device connectors and associated physical-port drivers, respectively (e.g. USB, SD, and MMC).

Figure 3:
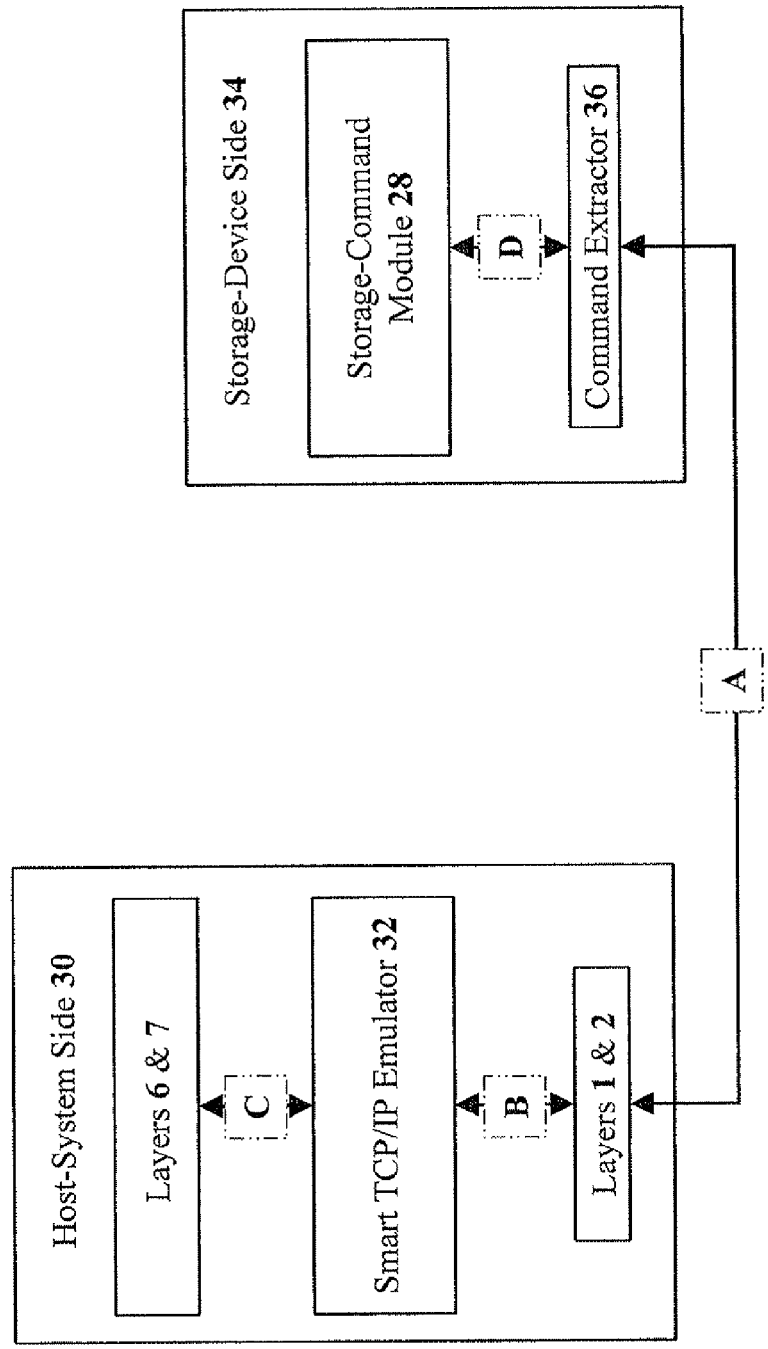
FIG. 3 is a simplified schematic block diagram of an implementation of a communication architecture using an alternative slim TCP/IP stack, according to example embodiments described herein.

FIG. 3 is a simplified schematic block diagram of an implementation of a communication architecture using an alternative slim TCP/IP stack, according to example embodiments described herein. A host-system side 30 is shown having a smart TCP/IP emulator 32. Smart TCP/IP emulator 32 in host-system side 30 differs from TCP/IP emulator 24 of FIG. 2 as smart TCP/IP emulator 32 of FIG. 3 includes the functions of converting TCP/IP commands received via interface C to storage-commands. In FIG. 3, the interpretation of the TCP/IP commands herein is performed inside the host system, in contrast to storage-command interpreter 26 of FIG. 2, which converts the TCP/IP commands to storage commands inside the storage device.

Smart TCP/IP emulator 32 also encapsulates the storage commands into specific physical port-driver commands. The storage-command instructions are sent to a storage-device side 34 over interface A. A command extractor 36 extracts the storage commands that were encapsulated by smart TCP/IP emulator 32, and sends the commands via interface D) to storage-command module 28. Storage-command module 28 receives the storage commands, and executes the appropriate storage-operations.

Figure 4:
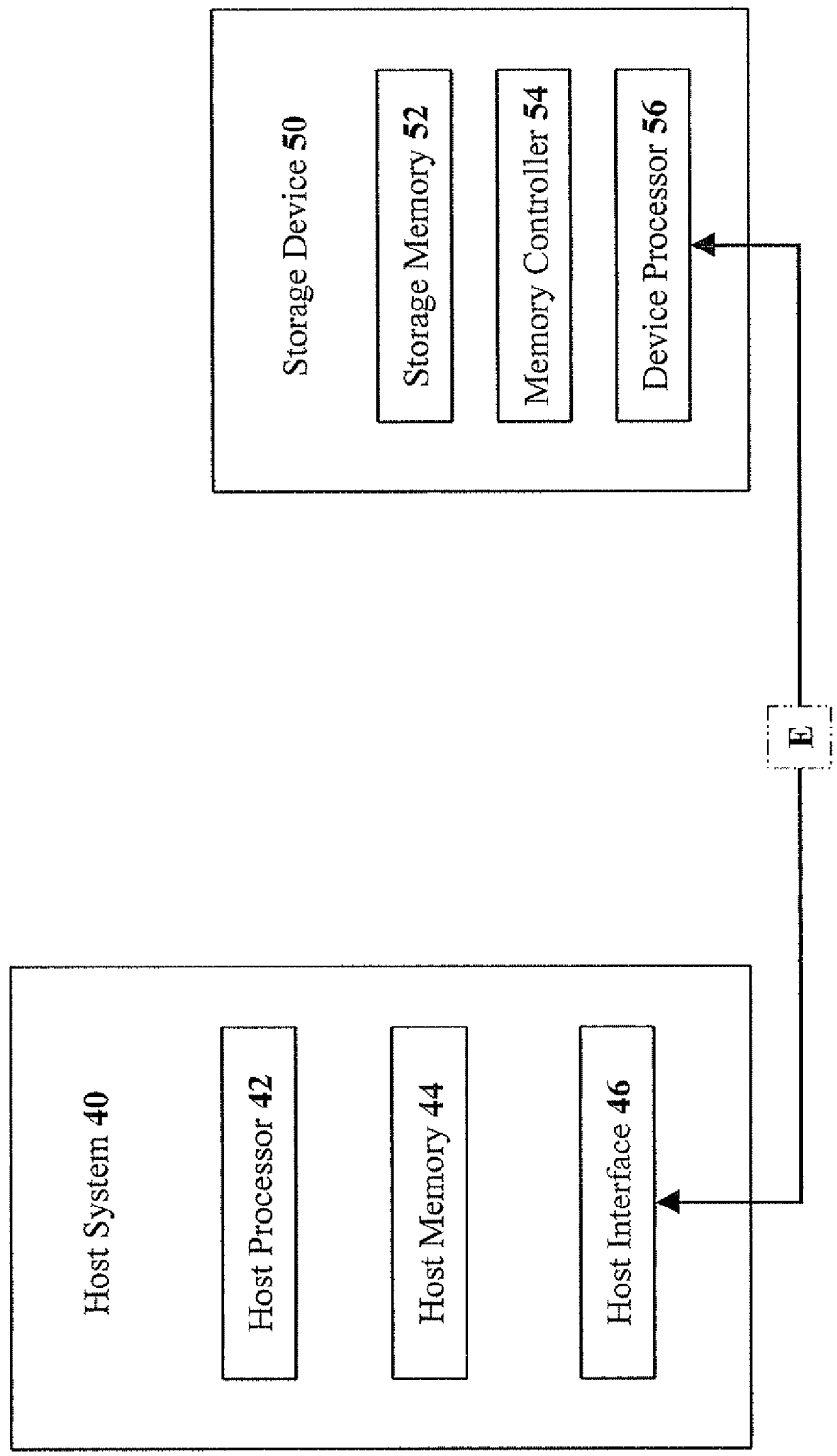
FIG. 4 is a simplified schematic block diagram of a host system configured to communicate with a storage device using a slim TCP/IP stack, according to example embodiments described herein.

FIG. 4 is a simplified schematic block diagram of a host system configured to communicate with a storage device using a slim TCP/IP stack, according to example embodiments described herein. A host system 40 (e.g. a cellular phone, a PDA, a laptop computer, or a desktop computer) having a host processor 42, a host memory 44, and a host interface 46 is shown. A storage device 50 (e.g. SIM card, a USB flash-memory device, an MMC card, or an SD card) is shown having a storage memory 52, a memory controller 54, and, optionally, a device processor 56. Host system 40 is operationally connected to storage device 50 via a connection interface E. It is noted that while host system 40 and storage device 50 are shown as separate components in FIG. 4, storage device 50 may reside within host system 40 as an internally-engageable component or an embedded component of host system 40.

While the invention has been described with respect to a limited number of example embodiments, it will be appreciated that many variations, modifications, and other applications of the invention may be made.

What is claimed is:

1. A method for establishing a communication link between a host and a storage device, the method comprising the steps of:
   providing on the host a communication stack including an application layer module, a slim TCP/IP module, and a host physical layer module;
   providing on the storage device a storage-command interpreter and a storage physical layer module; and
   establishing a communication channel between an application in the host and the storage device, said communication channel using said communication stack, said storage-command interpreter and said storage physical layer module;
   wherein the slim TCP/IP module,
      transfers application data without TCP/IP headers,
      adds headers and footers used by the physical layer, and
      converts TCP/IP commands from the application layer module into physical port driver commands sent to the host physical layer module.

2. The method of claim 1,
   wherein establishing the communication channel includes addressing the storage device by a static-IP address; and
   wherein a storage identifier is embedded into one of command parameters sent by said application to said slim TCP/IP module.

3. The method of claim 1, wherein the storage-command interpreter converts transferred application data to storage commands.

4. The method of claim 1, wherein the slim TCP/IP module transfers application data without TCP/IP footers.

5. The method of claim 1, wherein the slim TCP/IP module does not implement a standard TCP/IP stack.

6. The method of claim 1, wherein the slim TCP/IP module does not segment application data into multiple TCP/IP packets.

7. The method of claim 1, wherein the slim TCP/IP module does not manage TCP timeouts.

8. A non-transitory computer-readable storage medium having computer-readable code embodied therein for causing a communication link to be established between a host and a storage device, the computer-readable code comprising: program instructions for providing on the host a communication stack including an application layer module, a slim TCP/IP module, and a host physical layer module; program instructions for providing on the storage device a storage-command interpreter and a storage physical layer module; and program instructions for establishing a communication channel between an application in the host and the storage device, said communication channel using said communication stack, said storage-command interpreter and said storage physical layer module; wherein the slim TCP/IP module, transfers application data without TCP/IP headers, adds headers and footers used by the physical layer, and converts TCP/IP commands from the application layer module into physical port driver commands sent to the host physical layer module.

9. The non-transitory computer-readable storage medium of claim 8, wherein establishing the communication channel includes addressing the storage device by a static-IP address; and wherein a storage identifier is embedded into one of command parameters sent by said application to said TCP/IP slim module.

10. A storage device for communicating with a host system, the storage device comprising:
    a storage physical layer module in communication with a host physical layer, the host further including an application layer module and a slim TCP/IP module;
    a storage-command interpreter connected to the storage physical layer module; and
    a storage command module;
    wherein the slim TCP/IP module,
       transfers application data without TCP/IP headers,
       adds headers and footers used by the host physical layer, and
       converts TCP/IP commands from the application layer module into physical port driver commands sent to the host physical layer.

11. The storage device of claim 10, wherein a communication channel is established between the host and the storage device using a static-IP address; and
    wherein the communication channel includes a storage identifier embedded into command parameters sent by an application to said slim TCP/IP module.

12. The storage device of claim 10 configured as one of a SIM card, a USB flash-memory device, an MMC card, or an SD card.

13. The storage device of claim 10, wherein said host is configured as one of a cellular phone, a PDA, a laptop computer, or a desktop computer.

* * * * *